United States Patent [19]
Albertson

[11] Patent Number: 5,160,435
[45] Date of Patent: Nov. 3, 1992

[54] METHOD AND SYSTEM FOR BIO-MASS MANAGEMENT OF A TRICKLING FILTER

[76] Inventor: Orris E. Albertson, 1915 Wasatch Dr., Salt Lake City, Utah 84108

[21] Appl. No.: 744,457

[22] Filed: Aug. 12, 1991

Related U.S. Application Data

[63] Continuation-in-part of Ser. No. 659,739, Feb. 25, 1991.

[51] Int. Cl.⁵ .................................................. C02F 3/04
[52] U.S. Cl. .................................... 210/614; 210/617; 210/96.1; 210/138; 210/141; 210/150; 210/903
[58] Field of Search .......................... 210/614–619, 210/739, 96.1, 138–151, 209, 520, 903

[56] References Cited

U.S. PATENT DOCUMENTS

| | | | |
|---|---|---|---|
| Re. 22,144 | 7/1942 | Wood | 210/617 |
| 2,141,979 | 12/1938 | Halvorson et al. | 210/617 |
| 2,889,996 | 7/1959 | Kadden | 210/150 |
| 3,825,119 | 7/1974 | Rost | 210/139 |
| 4,486,310 | 12/1984 | Thornton | 210/617 |
| 4,931,183 | 6/1990 | Klein et al. | 210/617 |

*Primary Examiner*—Thomas Wyse
*Attorney, Agent, or Firm*—Richard F. Bojanowski

[57] ABSTRACT

A method and system for optimizing the operation of a trickling filter. Optimization is obtained by using a controlling device and a variable speed drive in combination. The drive motor rotates the distributor mechanism of the trickling filter in response to signals transmitted thereto by the controlling device. The signals received are either based on the influent flow rate or a pre-programmed system representing the above. In response to these signals, the speed of rotation of the distributor is continually varied to provide a SK value most conductive for (1) reducing the BOD and ammonia levels present in the wastewater influent, (2) removing excess bio-mass attached to the media used in the filter and (3) driving the organic food materials deeper into the bio-mass. SK values of between 5 to 100 mm/pass are used for normal operation and a SK of 100 to 1000 mm/pass for flushing during non-peak hours. An intermediate SK value is used to drive the organic feed deeper into the media. This SK value may vary over abroad range depending on the concentration of organic material present in the feed. Normally the optimum SK value will be between about 10 and 150 mm/pass. A method is also disclosed incorporating the above system.

13 Claims, 3 Drawing Sheets

METHOD AND SYSTEM FOR BIO-MASS MANAGEMENT OF A TRICKLING FILTER

CROSS-REFERENCES TO RELATED APPLICATIONS

This application is a continuation in part of U.S. patent application, Ser. No. 659,739 filed Feb. 25, 1991, now pending and entitled "Method and System for Optimizing the Operation of a Trickling Filter."

BACKGROUND OF THE INVENTION

1. Field of Invention:

This invention relates generally to the biological treatment of wastewater and particularly to a method and system for optimizing the operation of a trickling filter.

2. Description of the Prior Art:

The biological treatment of wastewater for the removal of oxygen demanding carbon and nitrogen compounds has been in use for many decades, both in the United States and Europe. Although there are several types of fixed film biological systems available, the trickling filter with a rotary distributor is the most common. The trickling filter is used primarily for reducing levels of BOD (biochemical oxygen demand) and TSS (total suspended solids) as well as the oxidation of ammonia to nitrates. Depending on the predominant ambient temperature at which the trickling filters are operated, some of the filters are covered or domed, while others are not. Examples of biological filters can be found in U.S. Pat. Nos. 2,642,394; 3,275,147; 3,596,767 and 4,486,310.

In order to better understand the current status of biological filters in the art, the following publications are of particular interest: Hawkes, H. A. "The Ecology of Waste Water Treatment" published by the MacMillan Co., New York, N.Y. 1963; Albertson, Orris E., "Slow Down That Trickling Filter!" and "Slow Speed Gains Momentum" WPCF Operations Forum, A WPCF publication for wastewater professionals, January and April, 1989, West Germany, Ein Regelwerk der Abwassertechnischen Vereinigung (ATV) Arbeitblatt A135 Section 3.2.2, Tropfkorperbemessung, April 1983, and Parker, et al., JWPCF publication "Enhancing Reactor Rates in Nitrifying Trickling Filters Through Biofilm Control", May, 1989.

The conventional trickling filter utilizes a film of bio-mass fixed on media to remove and aerobically convert organic matter to carbon dioxide, water and additional bio-mass and to oxidize ammonia ($NH_4N$) to nitrates. The fixed media generally consists of rock, plastic or wood. The surface area of the media varies from 12-15 $ft^2/ft^3$ for rock and wood to 27-45 $ft^2/ft^3$ for plastic. New construction of trickling filters uses predominantly plastic as its media at depths of at least 6 ft. to as high as 42 ft.

Wastewater is distributed over the bio-mass fixed to media through an overhead rotary distributor having generally four nozzled arms or spreaders. This insures a relatively even distribution of wastewater over the fixed bio-mass and thereby produces a relatively constant hydraulic and organic (food) loading throughout the upper portion of the filter's surface area.

Microorganisms and other forms of biological life are the active agents for converting the organic carbon and nitrogen into environmentally acceptable end-products. As a result, a number of operating parameters affect the efficient operation of trickling filters. Some of these include temperature, organic loading, aeration, wastewater characteristics, filter depth and bio-mass thickness, to name but a few.

In current practice, it is not uncommon to produce bio-mass thickness of between 0.10 to 0.30 inch (2.5-8 mm) as reported in the Albertson publication, mentioned above. Such bio-mass thicknesses can reduce the aerobic surface area by a factor of 20% or more. The aerobic bio-mass may be only 5-10% of the total bio-mass on the media. The excess or remaining bio-mass (90-95%) serves no useful purpose in organic removal. Instead, the excess accumulations of bio-mass produces numerous operating problems, such as (1) production of odors; (2) provides a haven for flies and snails; (3) reduces the aerobic surface area; (4) causes excess sloughing of bio-mass which in turn causes an imbalance to downstream processes and loss of aerobic bio-mass; and (5) discolors the filter effluent as well as reduced efficiency of $BOD_5$ and TSS removal.

Although there are a number of factors which affect the performance of trickling filters, such factors generally affect, either directly or indirectly, the growth of its active agent, the bio-mass. Therefore, one can conclude that it would be highly beneficial to control the bio-mass thickness to minimum levels and thereby provide a bio-mass layer which is predominantly aerobic and eliminate, as much as possible, the underlayer of anaerobic bio-mass. In the past, the bio-mass thickness has been partially and often ineffectively controlled by inconsistent and intermittent dosing or flushing of the media. Since trickling filters are normally driven by the hydraulic jetting action of its nozzled arms, any increase in wastewater flow also increases the speed at which the nozzled arms pass over the bio-mass. With such systems, the dosing or flushing of the bio-mass is frustrated.

In 1983, West Germany reported in a publication identified above that the dosing rate or flushing intensity (SK value) of bio-mass was critical in improving the efficiency of trickling filters. SK may be defined generally as the depth of water discharged to the surface of the filter media per pass of a distributor arm. This SK (spulkraft) value is defined by the following formula:

$$SK = \frac{(q + r)(1000 \text{ mm/m})}{(a)(n)(60 \text{ min/hr})}$$

Wherein "SK" represents the flushing intensity per pass in mm/pass, "q+r" represents the total average hydraulic flow in $m^3/m^2/hr$, "a" represents the number of distributor arms and "n" represents the rotational speed in rev./min.

Currently, SK values of between 2-10 mm/pass of an arm are common. Recently, (Albertson publication) SK values of 50-150 mm/pass were found to be highly beneficial. Still more recently, it has been determined that SK values up to 680/mm/pass have produced better results on strong (high BOD loadings) wastewaters. However, this does not mean that still higher SK values would be more beneficial as, at some point, increasing SK values will impair the filter's performance even if the bio-mass thickness is near optimum.

An increase in SK will reduce the retention time of the feed in the trickling filter. This can reduce the operating efficiency of the trickling filter even if the upper portions of the filter possesses optimal bio-mass content; i.e., aerobic and well flushed. This is of concern for filters operating at high levels of efficiency where high retention time (low SK) is needed to provide the most efficient treatment at maximum capacity. It is also recognized that many trickling filters often do not have good bio-mass development in the bottom half of the bio-towers and the growth is considered "patchy" (Parker, et al.). The reason is that the lower half of the media area fails to receive sufficient food ($BOD_5$ and $NH_4N$) as the biomass on the media area above consumes most of it. This prevents the lower portion of the media in the bio-tower to fully develop due to starvation.

Therefore, based on the prior art, there appears to be no specific optimum SK value for any given trickling filter. This is primarily due to the wide range of operating variables which may exist for any given wastewater. It would also appear that the optimum SK value for biological treatment and full bio-mass development will vary substantially from the optimum SK value for flushing out excess bio-mass.

In the patent application heretofore filed, a system was described wherein the trickling filter would be operated at essentially two sets of SK values. One set was used primarily for flushing excess bio-mass from the media and the other was used primarily for optimal removal of $BOD_5$. Although this type of system works well with most municipal waste water treatment systems, it has now been found that a still more efficient use of the trickling filter can be realized if the bio-mass located in the lower portions of the trickling filter is more fully developed.

As depicted in FIG. 1, the non-shaded area represents the SK values that were used in the above two step system. The shaded portion represents the effect that the SK values used in accordance with this invention would have on full development of biomass throughout the bottom depth.

For example, and as depicted in FIG. 1, if a flushing cycle of four hours at an SK of 300 mm/pass was used, only about 5% of the daily loading (food nutrients) would be available for development of the lower portions of the bio-mass. In order to accomplish the additional objective of developing the lower portions of the bio-mass, it is necessary to control the SK values as a function of the influent loading. This is depicted in FIG. 1 by the shaded area between the two step SK and the modulated SK value over a twenty-four hour period. As shown, modulated SK values vary exponentially with the loading as is necessary to ensure that food is delivered to the lower media zones. The shaded area is representative of the food transmitted to the lower zones as a result of higher SKs during the lower loading periods.

SUMMARY OF INVENTION

Therefore, a primary object of this invention is to provide a system and operational procedure for optimizing the efficiency of trickling filters by full utilization of the media.

Another object is to provide a system whereby optimum SK values can be established for treatment of wastewater and for flushing out excess bio-mass. A further object of this invention is to continuously modulate the SK and thereby insure a better transfer of food into the lower zones of the filter during lower loading periods. Another object is to fully develop the bio-mass in the lower half of a bio-tower and thereby enhance the treatment efficiency. Still another object of this invention is to provide a system and method of operation whereby the performance of a trickling filter is enhanced without having to continually monitor and control a multitude of operating variables.

These and other objects of this invention are accomplished by a system which utilizes a distributor adapted with a variable speed, remotely controlled, motorized drive and process controller which can modulate the distributor speed based on the influent flow signal or a programmed signal which is repeated every 24 hours.

The operation of the distributor arms would be modulated to a speed necessary to adjust the retention time of the influent introduced into a filter such that the food in the influent will continually penetrate the lower levels. Ideally, the speed would be in some proportion to the organic load (food in influent), but this measurement is not easily made. Even so, the influent flow is a good indicator and the loading can be synthesized into an operating signal.

To accomplish the above, the expression, set forth below for modulating SK values in an inverse relationship to flow and $BOD_5$ loading can be used.

$$SK = L_A(Q/Q_A)^{-x}$$

where:

$L_A$ = is an adjustable constant based on a function of organic loading or operating mode $Q_A$ = is an average daily influent flow in MGD $Q$ = is an instantaneous rate of influent flow in MGD $X$ = is an attenuating exponent for modifying hydraulic rates and is normally between about 1.5 to 3.0.

The constant, $L_A$, is approximately equal to the average $BOD_5$ loading over a twenty-four hour period for both carbonaceous BOD5 ($CBOD_5$) systems and combined $CBOD_5$ and nitrification systems. Tertiary nitrification systems may, in most cases, require a higher value for $L_A$ such as between about 10 to 50, which is 2 to 4 times the average $BOD_5$ loading. Normally the value for $L_A$ in non-nitrification systems is between about 20 to 200. The constant $L_A$ should therefore be considered an adjustable value in the algorithm.

The controller using a flow signal or a form of the algorithm set forth above would provide an SK value for achieving optimum treatment throughout a 24 four hour period. Normally a minimum SK value during treatment of between about 5–150 mm/pass and a maximum SK value of between about 100–1000 mm/pass will be used.

The system and method of this invention is particularly suited for use on at least two trickling filters concomitantly operated at identical operating conditions except that different SK formulations would be used alternatively during treatment in each of the trickling filters. Based on the performance of the two trickling filters, the SK formulations of the less desirable performer would be altered until a better performance value is realized. This operational sequence would be continued until the optimum SK formulation for treatment is defined for both units.

DESCRIPTION OF THE PREFERRED EMBODIMENTS

Figure 1:
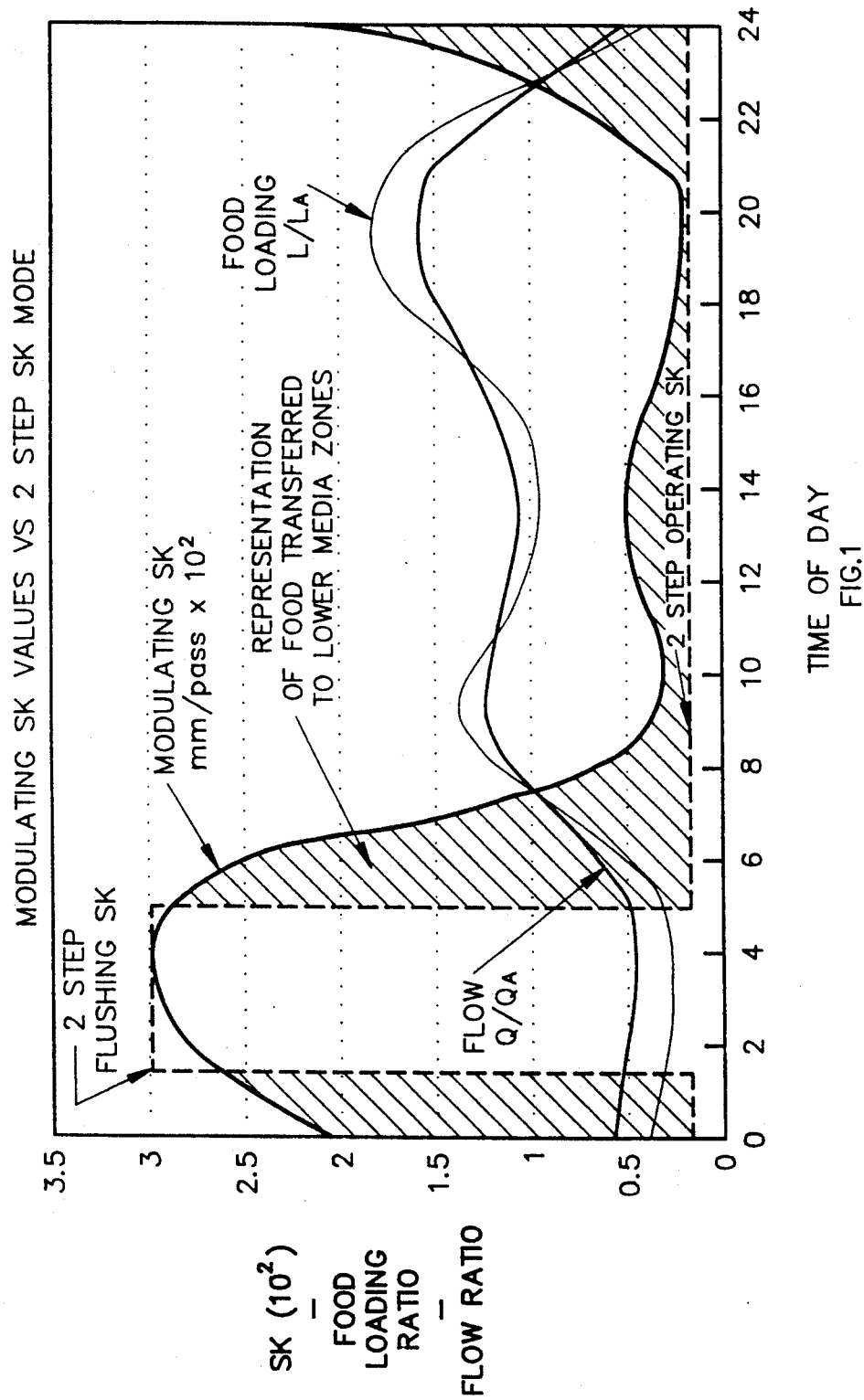
FIG. 1 is a graph wherein the horizontal axis represents the time of day in hours and the vertical axis represents the SK value, hydraulic flow and food ratio over a 24 hour period.
Figure 2:
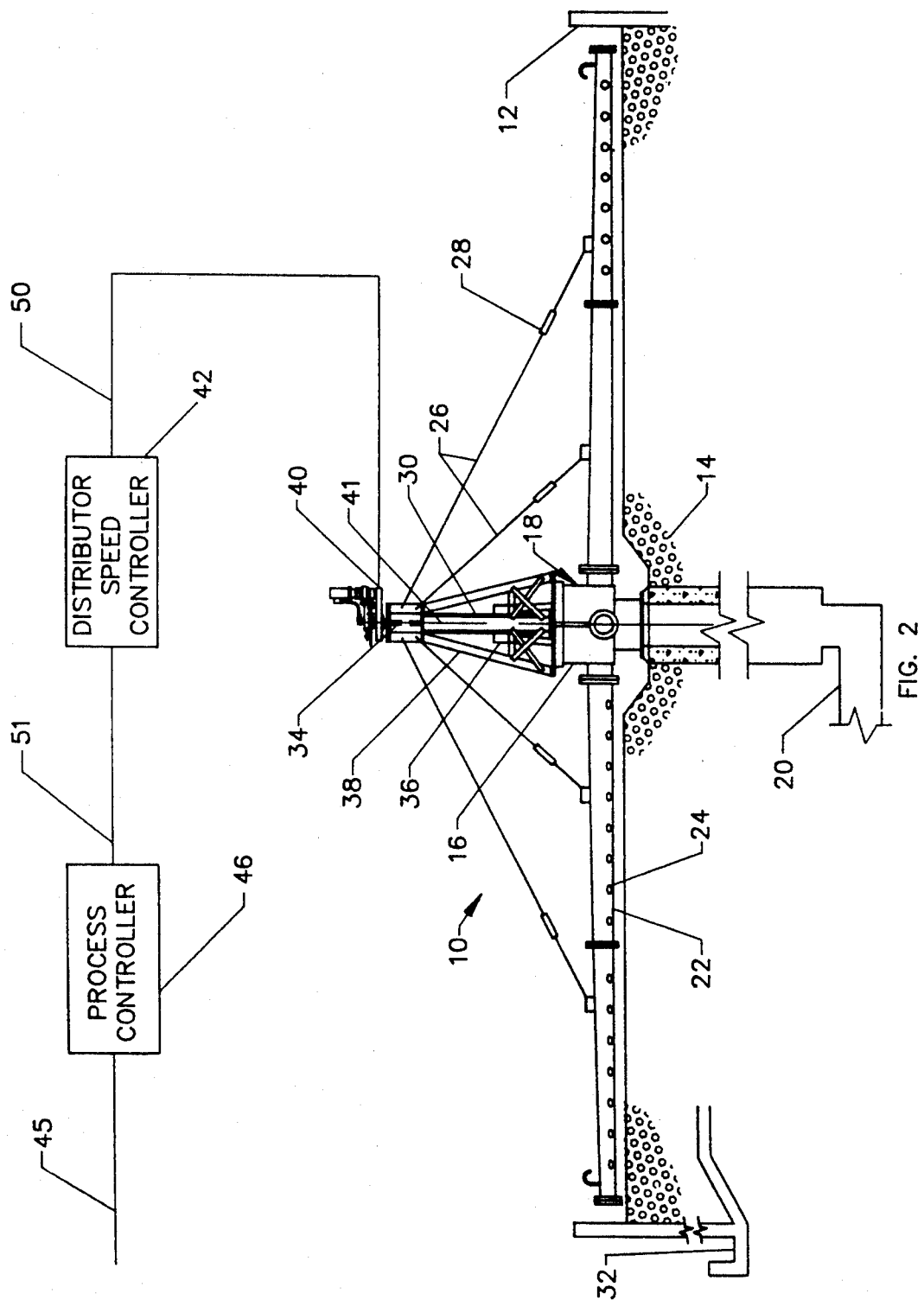
FIG. 2 is a partial cross sectional view and side elevation illustrating a typical wastewater trickling filter adapted with an electric motor which is remotely controlled by a process controller.

FIG. 1 is an illustrative example of a flow controlled distributor operation. The SK was modulated as a function of $SK = L_A(Q/Q_A)^{-x}$, where $L_A$ represents an average $BOD_5$ loading of 59 lb/1000 ft$^3$d. The attenuation factor, x, of 2.5 was selected to provide at least a 20:1 SK range of operation. FIG. 1 is a plot of the twenty-four hour cycle of the normalized flow ($Q/Q_A$) ratio, the normalized $BOD_5$ loading ($L/L_A$) ratio and the corresponding SK value. Normalized is when the average value is set at 1.0 and the range of the values varies around the value of 1.0. When the flow is low, the high SK will reduce detention and drive the food deeper into the media while simultaneously flushing the media. During the high loading periods, the SK is low in order to maximize the retention time and thereby enhance treatment capacity.

Referring now to the drawings wherein like reference numerals designate identical or corresponding parts, a trickling filter is identified and is shown generally by the numeral 10 and includes a tank 12 constructed of a water impervious material such as concrete or steel and is generally circular in shape. The interior of the tank is filled with a media 14 of stone, wood slats or plastic bundles or particulates. Preferably, the media selected is one having a high surface area and is capable of minimal deterioration during use. Affixed to the media is a biological substance generally referred to as bio-mass. The bio-mass, consisting of living microorganisms, will feed and grow on the organic materials contained in the wastewater which, during operation, will trickle across the bio-mass adhering to the media.

The wastewater is introduced into a barrel section 16 of a distributor shown generally by numeral 18 through a feed pipe 20 utilizing gravity flow or an auxiliary pump (not shown). The wastewater is then distributed into the distributor arm 22 and eventually dispersed over the bio-mass through orifices or nozzles 24 fixed and in communication with the distributor arms. Normally, each trickling filter will have two to six arms and preferably, at least two or the minimum required number to insure even distribution. The distributor arms are supported through cables or rods 26 fixed at various points along the arms radial extension and adjusted by turnbuckles 28. The other end of the rods 26 are fixed to a center mast 30 extending upwardly from the barrel 16. The effluent from the filter is collected in an underdrain network which leads to an outlet pipe or weir 32. Suitable thrust bearings 34 and stabilizing bearings 36 are included to provide for ease of rotation and to minimize wear during any rocking motion that may occur during high wind conditions. To insure stability of the entire system, suitable support members 38 are also provided.

A driving means 40, which is normally a ¼ to ½ h.p. variable speed electric or hydraulic motor is fixed and communicatively geared to the center mast 34. When the motor 40 is energized, the distributor arms will rotate at a rate determined by a remote speed controller 42 based on an influent flow signal or the generated signal received through line 51 from a process controller 46. The signal is converted to a rate of rotation using an algorithm in the process controller or from a flow signal received through line 45. The rate of rotation determined by the controller is then electrically transmitted to the motor through line 50, causing the distributor arms to rotate at a speed determined from the algorithm.

Currently, the available distributor speed range will be up to 20:1 which will ensure proper flushing of the media during the low loading (flow) period in a 24 hour day. As a result, the SK range will also be at least 20:1. During high feed load periods, the SK value will normally be between 5 to 150 mm/pass and during the low flow/load periods the SK value will be between 100 to 1000 mm/pass.

Figure 3:
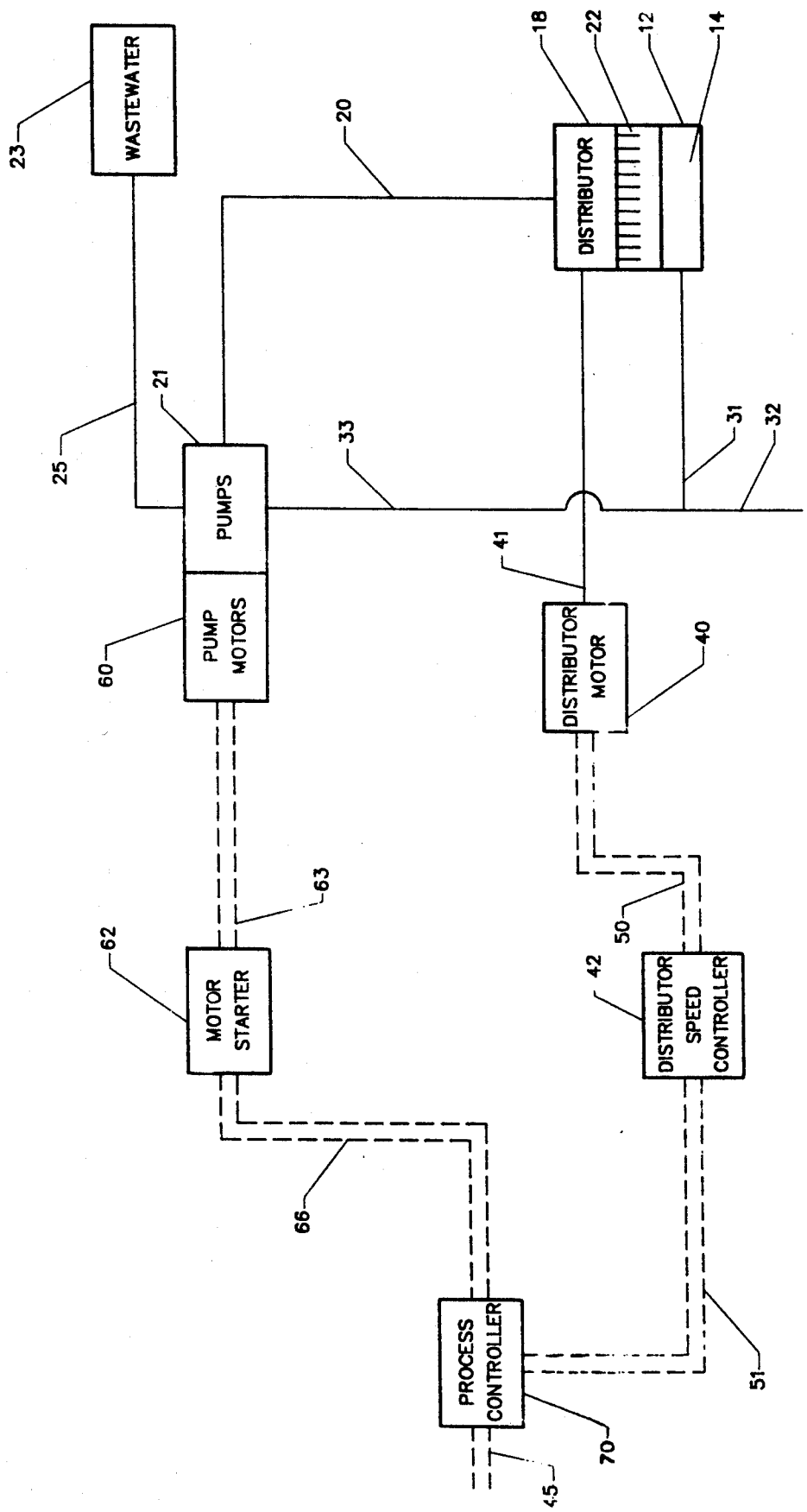
FIG. 3 is a block diagram illustrating how a trickling filter distributor may be connected to an electric motor, a controller and signal generator (or flow signal) to provide the system of this invention.

As can be seen in FIG. 3, the operation of the system and method of this invention is depicted in block diagram form. Wastewater is introduced into a rotatable distributor 18 from a wastewater source 23 by gravitational or pressurized flow through lines 25 and 20. If desired, an auxiliary pump or pumps 21 may be used to augment and thereby increase the flow. The wastewater is distributed over the bio-mass 14 contained in tank 12 through nozzled arms 22 extending radially and outwardly from the rotatable distributor. Rotation of the distributor and radially extending arms is accomplished by an electric (or hydraulic) distributor motor 40 connected by a drive shaft 41 to the distributer 16. The rate of movement of the distributor is controlled by a controller 42 through an electrical conduit 50. Under typical operation, each arm of the distributor will make one revolution during each 1-60 minute period which is the equivalent to 0.017 to 1.0 revolution/minute. This rate of speed will generally produce a SK value of between about 5-1000 mm/pass, although the individual filters will have an SK range of about 20:1. The "mm" in the SK value represents the depth of the wastewater that would be discharged onto the surface of the trickling filter as one arm of the distributor passes over the media. In other words, a reduction of distributor speed will increase the SK value as will an increase in the rate of flow of wastewater into the filter.

The process controller 46 would be capable of controlling the speed of more than one distributor. To determine the optimum SK range, the value of x in the algorithm $SK = L_A(Q/Q_A)^{-x}$ is changed on one filter and the performance compared. For example, the SK value at different periods of time and flows would be as shown in Table 1 for three values of X at an average $BOD_5$ Loading ($L_A$) of 40 lb/1000 ft$^3$·d.

TABLE 1

| | Example of Developing the SK Profile | | |
|---|---|---|---|
| | Flow Ratio | SK-mm/pass | | |
| Time | $Q/Q_A$ | x = 1.8 | x = 2.4 | x = 3.0 |
| 0400 | 0.30 | 280.0[1] | 199.0[1] | 140.0[1] |
| 0800 | 1.20 | 29.0 | 26.0 | 23.0 |
| 1200 | 1.00 | 40.0 | 40.0 | 40.0 |
| 2000 | 0.56 | 14.0 | 9.9 | 7.0 |
| 2400 | 2.00 | 139.0 | 192.0 | 140.0[1] |

[1]Maximum SK value at 20:1 range based on a minimum SK value times 20.

The algorithm output can be further modified by changing $L_A$ to a different value. In this manner an infinite number of control modes can be generated. Therefore, two or more trickling filters can be optimized by operating with two or more different algorithms and determining the best performance by analyzing the influent and effluent.

If for any reason the controller is unable to reduce the rotation of the distributor arms to obtain a higher SK value, as may be needed during flushing, the process controller 46 can start pump motor 60 to increase the rate of flow of wastewater into the filter and thereby further increase the SK value. This can be accomplished by either increasing the flow of wastewater through lines 25 and 20 or by activating a motor starter 62 through process controller 46 and electrical lines 63 and 66 which in turn activates the pump motor 60 and pump 21 to recycle some of the effluent through line 31 from the trickling filter into the distributor through line 33.

As previously alluded to in the specification, the filter distributor is operated at optimum treatment speeds to produce a lower SK during peak periods; that is, when the wastewater contains a higher quantity of organic materials. During the lower flow periods, the distributor speed will be much slower and the SKs proportionally higher to transfer food to the lower portions of the media. In some cases it may be necessary to augment the flow for flushing. The process controller 46 would then start pump motor 60 by activating motor starter 62 through lines 66 and 63 for a preprogrammed period. Conversely, the same controls can reduce pumped flows when pumping is not needed and to reduce power costs.

Obviously, the volume of wastewater or recycled effluent introduced into the filter can be substantially increased during the low flow periods as very little organic material would be present. Therefore, an increase in flow will not adversely effect the treated effluent quality of the filter. In fact, there will be beneficial effects of the increased SK as an inverse function of flow (loading). The lower retention time at higher SK will increase bio-mass growth in the lower bio-tower areas without causing a deterioration of effluent quality.

Most wastewater treatment plants have at least two trickling filters that are operated on a twenty-four (24) hour basis. By adapting the trickling filters with motors and controllers so that it would operate in the manner heretofore described, a convenient system is available for maximizing the efficiency of the trickling filters on an ongoing and continuous basis.

This would be accomplished by setting up at least two filters to operate on different algorithms of the form $SK = L_A(Q/Q_A)^{-x}$. For example, two filters operating at 30 lb BOD5/1000 ft$^3$·d would initially employ $L_A=30$ and vary x to find the most efficient 24 hr SK pattern. One filter could operate with a formulation of $SK=30(Q/Q_A)^{-1.8}$ and the other at $SK=30(Q/Q_A)^{-2.2}$. When the most efficient mode is determined by measuring best effluent quality (lowest BOD5) for about 10 days, then the poorer unit SK would be modified by increasing its SK value to a value greater than the best performer. For example, if the X=2.2 operation was better than the X=1.8 operation, the X=1.8 would be increased X=2.6 and the 10-day testing repeated in a similar manner until the best value of X was determined.

Further experiments to determine the best value of the combined effects of $L_A$ and X variable may also be conducted wherein $L_A$ is modified and X is held constant. When the best operating mode is determined, all other units at a site could be altered and operated under the same parameters. The value of $L_A$ for one trickling filter is not necessarily the best for all trickling filter operations. The value of $L_A$ for each trickling filter's operation is site specific and requires repetitive testing to determine optimum modes.

The signal generators, controllers and drives that may be used in this invention are conventional devices readily available on the market. Examples of suitable devices are programmable speed controllers such as those manufactured by or are available through Diversified Electronics. Suitable controllers are basically potentiometers available, for example, through Cutler Hammer. In larger facilities, a microprocessor can be employed to control several, or more, distributors. The signal generator process controller and distributor speed controller may also be combined as one microprocessor. These are also readily available on the open market.

One added advantage that the system and process of this invention has over systems now in use is that if there is a substantial change in influent quality or if the growth rate of the bio-mass is altered due to seasonal or temperature changes, the SK values can be conveniently modified by changing the algorithm in the process controller.

If a more sophisticated system is desired, sensors may be used to measure the BOD, TOC or COD concentrations, for example, in the influent and effluent of a trickling filter. The measurements obtained could then be entered into a computer and analyzed. Based on the analysis, signals would be sent to the controllers and timers altering the information previously entered and thereby enhance the operation of the trickling filter by modifying the SK values then in use. The result would be a substantially fully automated, anticipatory (feed forward—feed back) system.

While the prior apparatus descriptions have been directed to centrally driven distributors, equally good results can be obtained employing peripheral and transverse drive arrangements. The drive system may also be hydraulic or electrical and provide the same process benefits. Obviously, many modifications and variations of the present invention are possible in light of the above teachings. It is therefore to be understood that, within the scope of the appended claims, the invention may be practiced otherwise than is specifically described.

I claim:

1. A trickling filter comprising:
  (a) a tank having a liquid inlet for receiving an influent flow of wastewater and an outlet;
  (b) a media to which a bio-mass is fixed is maintained within said tank;
  (c) a rotatable or transverse distributing means mounted above said media for evenly distributing said influent flow of wastewater over said biomass;
  (d) a remotely controlled, variable speed motor for driving said distributing means;
  (e) a controlling means operably connected to said variable speed motor for varying the rotatable speed of said distributing means to provide a modulating SK value over a twenty-four hour period;
  (f) a signal means for transmitting information to said controlling means for modulating said SK value to provide a SK value most conducive to reducing the BOD5 and NH4N level, a SK value for removing excess bio-mass and a SK value for developing lower portions of said bio-mass all over a twenty-four hour period.

2. The trickling filter of claim 1 including a means for providing information to said signal means whereby said SK value can be modulated in direct response to said influent flow of wastewater in accordance with the formulation $SK = L_A(Q/Q_A)^{-x}$ wherein $L_A$ is a function of the average $BOD_5$ loading of said daily influent flow Q is the daily influent flow rate at a specific point in time, $Q_A$ is the daily average of an influent flow and X is an attenuation factor with values of between 1.5 and 3.0.

3. The trickling filter of claim 1, including a means for introducing a pre-programmed algorithm for removal of $BOD_5$ and combined $BOD_5$ and $NH_4N$ into said signal means based on the formulation $SK = L_A (Q/Q_A)^{-x}$ wherein $L_A$ is the average $BOD_5$ loading of said daily influent flow, Q is the daily influent flow rate at a specific point in time, $Q_A$ is the daily average of an influent flow and X is an attenuation factor with values of between 1.5 and 3.0.

4. The trickling filter of claim 1, including a means for introducing a pre-programmed algorithm for tertiary removal of $NH_4N$ into said signal means based on the formulation $SK = L_A (Q/Q_A)^{-x}$ wherein $L_A$ is 2 to 4 times the average $BOD_5$ loading of said daily influent flow, Q is the daily influent flow rate at a specific point in time, $Q_A$ is the daily average of an influent flow and X is an attenuation factor with values of between 1.5 and 3.0.

5. The trickling filter of claim 1 wherein said distributing means includes at least two radially extending arms adapted with nozzles for introducing said wastewater over said bio-mass.

6. The trickling filter of claim 1 wherein said controlling means is capable of providing a range of SK values of at least 20:1.

7. The trickling filter of claim 1 wherein said filter includes a pumping means operably connected to said controlling means or signal generating means for introducing more or less volumes of recycled effluent into said distributing means for distribution over said biomass at preselected conditions in response to signals received from said controlling means or said signal generating means.

8. A method for optimizing the operations of a trickling filter over a twenty-four hour period comprising the steps of:
(a) modulating said filter's distributor speed to achieve SK values most conducive for reducing $BOD_5 + NH_4N$ levels in a wastewater influent;
(b) gradually decreasing said filters distributor speed to achieve higher SK values for developing biomass located near the lower portions of said trickling filter; and
(c) further decreasing said filters distributor speed to achieve still higher SK values for flushing excess bio-mass from said filter.

9. The method of claim 8 wherein said SK values in step (a) will be between about 5 to 100 mm/pass.

10. The method of claim 9 wherein said SK values in step (b) will be between about 50 to 300 mm/pass.

11. The method of claim 10 wherein said SK values in step (c) will be between about 200 to 1000 mm/pass.

12. A method for optimizing the operation of a trickling filter having rotatable distributor arms over a 24 hour period comprising the steps of modulating the speed of said distributor arms to produce SK values in accordance with the formulation $SK = L_A (Q/Q_A)^{-x}$ wherein $L_A$ is the average $BOD_5$ loading of said daily influent flow, Q is the daily influent flow rate at a specific point in time, $Q_A$ is the daily average of an influent flow and X is an attenuation factor with values of between 1.5 and 3.0.

13. A method for optimizing the operation of a trickling filter having rotatable distributor arms over a 24 hour period comprising the steps of modulating the speed of said distributor arms, to produce SK values for tertiary removal of $NH_4N$ in accordance with the formulation $SK = L_A (Q/Q_A)^{-x}$ wherein $L_A$ is 2 to 4 times the average $BOD_5$ loading of said daily influent flow, Q is the daily influent flow rate at a specific point in time, $Q_A$ is the daily average of an influent flow and X is an attenuation factor with values of between 1.5 and 3.0.

* * * * *